F. S. OAKES.
Milk-Coolers.

No. 135,284. Patented Jan. 28, 1873.

UNITED STATES PATENT OFFICE.

FRANK S. OAKES, OF CATTARAUGUS, NEW YORK.

IMPROVEMENT IN MILK-COOLERS.

Specification forming part of Letters Patent No. 135,284, dated January 28, 1873.

*To all whom it may concern:*

Figure 1:
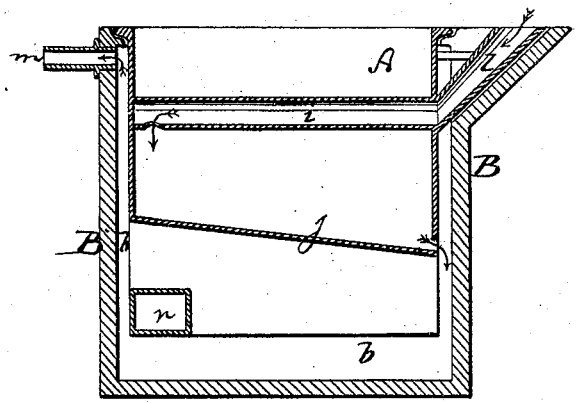
Figure 2:
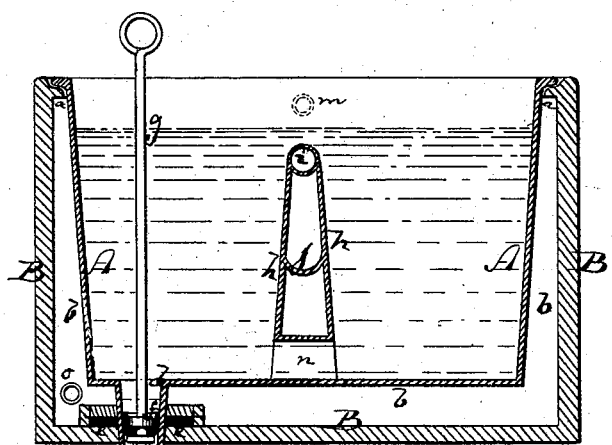
Figure 3:
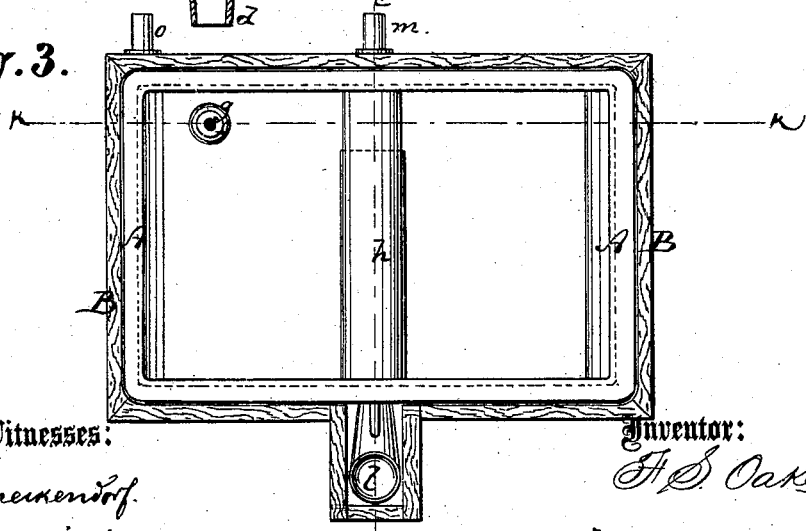

Be it known that I, FRANK S. OAKES, of Cattaraugus, in the county of Cattaraugus and State of New York, have invented a new and Improved Milk-Cooler, of which the following is a specification:

Figure 1 is a vertical transverse section of my improvement on the line *c c*, Fig. 3. Fig. 2 is a vertical longitudinal section on the line *k k*, Fig. 3. Fig. 3 is a top view of the same.

Similar letters of reference indicate corresponding parts.

This invention relates to a new apparatus for cooling the milk of which the cream is to be used for churning, and also for cooling the milk that is to be sent to city markets, &c. The invention consists in so arranging water-conducting pipes that the warmest milk and coolest water, and vice versa, will always be in the same or approximately the same plane or locality, as hereinafter more fully described.

In the accompanying drawing, the letter A represents the milk chamber or vessel in which the milk is to be cooled. It is made of sheet metal, of rectangular or other form and suitable size. B is the water-chamber or outer vessel surrounding the vessel A, and holding the same suspended by means of an inner flange, *a*, near the top, as shown in Fig. 2. There is a water-space, *b*, formed around and below A within the vessel B. The discharge-pipe *d* projects from the bottom of the vessel A through a hole in the bottom of B, and is packed by a rubber plate, *d*, which is secured to the bottom of B, and surrounds the discharge-pipe, as shown in Fig. 2. A plug or valve, *f*, fastened to the lower end of the rod *g*, closes the discharge-pipe *d*, as shown. The bottom of the vessel A is at or near the middle carried up to form a sort of partition, as at *h*, across the milk-vessel. The partition is double, and contains two or more horizontal or slightly-inclined water-conduits, *i* and *j*. The cold water is poured into the upper pipe, *i*, through an inclined spout, *l*, and flows along the same; thence into *j*, and down into the water-space *b* within the vessel B. The coldest water, being first applied to the upper part of the elevated bottom *h*, affects thus the upper stratum of milk in A, and extends in consequence its greatest degree of utility while in the pipe *i* within the space *b*. The warm part of the water ascends and finally flows out of the top of the vessel through a pipe, *m*. The partition or elevated bottom *h* is perforated, as at *n*, so that the milk can circulate from one side to the other of the vessel A. There is also a lower discharge-pipe, *o*, in the vessel B for drawing off the entire supply of water whenever it is desired.

It will be understood that the opening *n* through the elevated bottom or partition *h* is not in communication with the water-space, but only a connecting-channel for the halves of the milk-chamber.

In large dairies several of these devices—say four—are placed side by side, one slightly lower than the other, so that the water may from one vessel flow into the other until its temperature is nearly equal to that of the milk, and then be discharged.

The chamber A can be of suitable depth—the deeper the better for deep setting.

Having thus described my invention, I claim as new and desire to secure by Letters Patent—

1. The arrangement, in a milk-receiving vessel or cooler A, of two or more water-conducting pipes or their equivalents in different horizontal planes, as herein described, whereby the coolest water and the warmest stratum of milk and the warmest water and coolest stratum of milk are respectively brought into the local relation specified.

2. The pipe *i* and conduit arranged within the partition *h* of the vessel A, as and for the purpose set forth.

FRANK S. OAKES.

Witnesses:
EUGENE AIBACH,
J. H. RYDER.